US009223901B2

(12) United States Patent
Rabben

(10) Patent No.: US 9,223,901 B2
(45) Date of Patent: Dec. 29, 2015

(54) METHOD FOR SELECTING ELEMENTS IN TEXTUAL ELECTRONIC LISTS AND FOR OPERATING COMPUTER-IMPLEMENTED PROGRAMS USING NATURAL LANGUAGE COMMANDS

(76) Inventor: Michael Rabben, Rottenburg (DE)

( * ) Notice: Subject to any disclaimer, the term of this patent is extended or adjusted under 35 U.S.C. 154(b) by 1061 days.

(21) Appl. No.: 13/293,073

(22) Filed: Nov. 9, 2011

(65) Prior Publication Data
US 2012/0278084 A1 Nov. 1, 2012

(30) Foreign Application Priority Data

Nov. 10, 2010 (EP) .................................. 10014446

(51) Int. Cl.
G06F 17/00 (2006.01)
G06F 17/30 (2006.01)

(52) U.S. Cl.
CPC ............................. G06F 17/30967 (2013.01)

(58) Field of Classification Search
USPC ............................................................ 704/9
See application file for complete search history.

(56) References Cited

U.S. PATENT DOCUMENTS

| 5,598,522 | A  | * | 1/1997  | Inatomi ........................ 715/821 |
| 6,414,699 | B1 | * | 7/2002  | Pittore ......................... 715/808 |
| 6,659,862 | B2 | * | 12/2003 | Wong ............................. 463/10 |
| 7,136,876 | B1 | * | 11/2006 | Adar et al. ........................ 1/1 |
| 7,577,921 | B2 |   | 8/2009  | Zink |
| 8,171,403 | B2 | * | 5/2012  | Flint et al. ..................... 715/261 |
| 8,498,999 | B1 | * | 7/2013  | Bhalotia ........................ 707/767 |
| 2002/0002453 | A1 |   | 1/2002  | Lazaridis et al. |
| 2002/0116528 | A1 |   | 8/2002  | Vale |
| 2005/0086234 | A1 |   | 4/2005  | Tosey |
| 2005/0210061 | A1 |   | 9/2005  | Chang et al. |
| 2007/0112749 | A1 | * | 5/2007  | Huang ............... G06F 17/30525 |
| 2007/0214122 | A1 | * | 9/2007  | Bala ....................... G06F 3/0481 |
| 2007/0288648 | A1 | * | 12/2007 | Mehanna .......... G06F 17/30867 709/231 |
| 2008/0126996 | A1 |   | 5/2008  | Morris et al. |
| 2008/0319952 | A1 | * | 12/2008 | Carpenter ........... G06F 17/3064 |
| 2009/0006359 | A1 | * | 1/2009  | Liao ................................ 707/5 |
| 2009/0024603 | A1 | * | 1/2009  | Zink ................................. 707/5 |
| 2009/0172541 | A1 | * | 7/2009  | Acedo ................. G06F 9/45512 715/708 |
| 2009/0253463 | A1 | * | 10/2009 | Shin et al. ...................... 455/563 |
| 2010/0106717 | A1 | * | 4/2010  | Melman ........................ 707/723 |
| 2010/0122213 | A1 | * | 5/2010  | Chen ............................. 715/827 |
| 2010/0179961 | A1 | * | 7/2010  | Berry ................... G06Q 10/107 707/769 |
| 2011/0246944 | A1 | * | 10/2011 | Byrne .................... G06F 3/0489 715/835 |
| 2012/0109974 | A1 | * | 5/2012  | Feng et al. ..................... 707/748 |
| 2013/0219333 | A1 | * | 8/2013  | Palwe ............... H04M 1/72522 715/810 |

FOREIGN PATENT DOCUMENTS

EP 0964343 12/1999

* cited by examiner

Primary Examiner — Abdelali Serrou
(74) Attorney, Agent, or Firm — Smartpat PLC

(57) ABSTRACT

A method for controlling a program by natural language allows a user to efficiently operate a computer-implemented target program through intuitive natural language commands. A list of natural language commands related to the target program is compiled. Each natural language command is stored as an element in an electronic list. Natural language commands generally consist of short sentences comprising at least a predicate (a verb) and an object (a noun). A user can filter the list of natural language commands by entering the initials of a natural language command. The user enters the first character of the first word to be filtered, followed by the first character of the second word to be filtered, and so forth. Filtering by initials very rapidly reduces the number of choices presented to a user and minimizes the number of keystrokes required to select a particular list element.

32 Claims, 15 Drawing Sheets

METHOD FOR SELECTING ELEMENTS IN TEXTUAL ELECTRONIC LISTS AND FOR OPERATING COMPUTER-IMPLEMENTED PROGRAMS USING NATURAL LANGUAGE COMMANDS

TECHNICAL FIELD

The present disclosure relates to a computer-implemented method for selecting elements from textual electronic lists and use thereof to operate computer-implemented programs with natural language commands.

BACKGROUND

A common task facing a user while operating a computer-implemented program is to select elements from an electronic list. Often these elements consist of more than one word, the words being separated by a space or other separating character such as a hyphen, dot, or underscore. This applies for example to electronic lists comprising persons' names, where each element in the list typically comprises at least a first name and a last name. It also applies to lists of folder names, file names, video titles, audio titles, book titles, document titles, or the like.

Existing methods to select a textual list element require the user to scroll through the list. Alternatively, with an incremental search method, as for instance used in "Google suggest", the user may start entering the text of the desired list element in a respective search field. While entering text into the search field the user is presented—with each letter entered—a progressively and incrementally smaller sub-selection of the list. The user can at any point scroll through the sub-selection of the list to select the desired list element. Alternatively, the user can keep typing until the selected list element has been distinctly filtered.

Depending on the number and on the structure of list elements, this can be time consuming and tedious. It is therefore desirable to provide a more efficient method to select textual elements from electronic lists.

Another problem facing many users of existing computer-implemented programs is that they are difficult to use. This applies to computers and other devices like palmtops, handhelds, mobile and stationary telephones, cameras, video, audio, and navigation devices, appliances and so forth. To enter a command in known programs and devices, the user has to typically navigate through several menus until reaching the desired command. Or the user has to click a respective icon using a computer mouse or the like, or his fingers when operating a touch screen. Or the user has to press special keys or key combinations. Or the user has to combine these methods.

This traditional way of entering commands has several disadvantages:
a) The menu structure which is often the only way for a user to complete a task usually requires several steps of user interaction and is not intuitive.
b) In order to use the computer mouse or the like, the user has to move his hand away from the keyboard and precisely position the mouse cursor to the respective spot on the screen. This can be time consuming and tedious.
c) Icons have to be known and found. Moreover, icons are usually not available for all commands.
d) Key combinations usually do not give a clue to the command's meaning and differ in different computer-implemented programs on computers and other devices. As a consequence the user would have to memorize key combinations for each computer-implemented program, in order to efficiently use them.

Another disadvantage is that users happen to accidentally and unwillingly enter key combinations while editing text. This often leads to undesired effects. Sometimes the work of several hours can get messed up.

It is therefore desirable to provide an improved method to operate computer-implemented programs.

SUMMARY

The present application discloses an improved computer-implemented method for efficiently selecting elements from an electronic list. The method applies especially to lists comprising elements consisting of two or more words. It further discloses how the improved method can be applied to provide an improved user interface for controlling computer programs with natural language.

A method known as "incremental search" is described in US 2007/0043750. The method enables users to filter electronic lists by entering text into a filter field and progressively reduce the electronic list to only include elements that comprise the text that was entered in the filter field. While this known method is effective at presenting a user with increasingly shorter list of elements with each successive keystroke, the number of keystrokes required to reduce the list can be high. This is particularly true for lists where elements consist of several words. In this case the user has to enter a complete word to further reduce the number of presented choices by the second word.

An alternative method for searching a library (list) for one or more titles (elements) is disclosed in U.S. Pat. No. 7,577,921. The disclosed method searches a library for a set of titles based on a plurality of inputs. Each title in the library includes a plurality of words. The number of words in each title is at least equal to the number of inputs received from the user, and each of the plurality of inputs matches the first letter of a respective one of the plurality of words in each of the titles. The number of titles in the set is progressively reduced in response to each successive input. U.S. Pat. No. 7,577,921 is hereby incorporated by reference thereto.

Electronic lists, especially those comprising elements consisting of two or more words, can be efficiently filtered by initials. To filter by initials a user enters the first character of the first word to be filtered, followed by the first character of the second word to be filtered, and so forth. For example, entering an initials filter "ab" reduces an electronic list to only those elements whose first word begins with "a" and whose second word begins with "b". Filtering by initials very rapidly reduces the number of choices presented to a user and minimizes the number of keystrokes required to select a particular list element.

Filtering by initials can be further improved by allowing the user to enter a character that has been defined as a delimiter, and in response thereto filter the list to only present elements that have the same number of words as the number of initials entered.

Filtering by initials can be applied to many different list types. It may, for example, be applied to select entries from lists comprising movie or song titles, folder names, file names, contact names, or the like. Initials need not be limited to letters. Instead, each of the plurality of inputs may be a digit or other character. An unfiltered electronic list may be displayed prior to receiving input from the user.

The advantages of rapidly selecting entries from lists comprising entries having a plurality of words can be used to efficiently control computer programs with natural language commands. Natural language control may, for example, be applied to control office programs, accounting programs, graphics programs, internet browsers, operating systems and so forth. Programs to be controlled by natural language are hereafter referred to as target programs. Natural language control is not limited to use in computers, but may be applied to other computing devices that run computer-implemented programs, such as palmtops, handhelds, mobile and stationary telephones, cameras, video, audio, and navigation devices, appliances and so forth. Natural language control may be applied to devices with and without (limited) keyboards, to devices having touch screens, or the like.

Traditionally, operating a computer software program requires the user to become familiar with and memorize a hierarchical menu structure. The user must, for example, know that opening a document requires selecting a "file" menu and selecting the "open" command within the file menu. In a specific example of using Microsoft Word™ a user must memorize that inserting a footnote is within the "references" menu or that inserting a comments into a document is within the "review" menu. Generally, a user must memorize the respective icon, special key, or key combination, if available, to execute a command in the target program. Without knowledge of the program's menu structure a user's efficiency in operating a program such as Microsoft Word™ is severely impacted, requiring the user to study a manual or use an integrated help function.

In contrast, the disclosed method for controlling a program by natural language allows a user to efficiently operate a computer-implemented target program through intuitive natural language commands. In a first step a list of natural language commands related to the target program is compiled. Each natural language command is stored as an element in an electronic list. Natural language commands generally consist of short sentences comprising at least a predicate (a verb) and an object (a noun), such as "open file", "color font red", "align text left", "zoom 200%", etc. For practical reasons, the object may be omitted for very frequently used commands. For example, instead of "copy marked item(s) to clipboard" a single-word natural language command "copy" may be used. Each natural language command is associated with a command in the target program.

More than one natural language command may be associated with each command in the target program and a natural language command may comprise more than one command in the target program, thereby establishing an m:n relationship between natural language commands and target program commands.

To standardize usage, it is intended to use common natural language commands, i.e. identical phrases, for various target programs. For example, the natural language command "open file" can be universally applied to almost any target program.

Natural language commands, as well as any other type of textual list elements, can be used in any language such as English, Spanish, French, German, etc. If a language permits different sequence of predicate and object, the sequence to be used can be customized. For example, in German the user may be presented an option to list natural language commands in the order object-predicate (for example "Datei öffnen", "Text rot färben") or in the order predicate-object (for example "Öffne Datei", "Färbe Text rot"), or both.

Natural language control of a target program may be provided as an inherent part of a target program. It may, however, also be provided by use of a separate control program, which is executed concurrently with the target program.

The control program can be invoked through the target program or from the operating system of the respective computer or other computing device. The target program may for example be invoked by a function key, a predetermined key combination, an icon or a menu.

The control program comprises a list of natural language commands, each natural language command being associated with one or more commands of the target program. Natural language commands may comprise a plurality of words.

When the control program is invoked, a graphic user interface is displayed to the user. The graphic user interface comprises at least one input field to receive inputs from the user. The input field may especially be a filter field for entering text. The graphic user interface further comprises a list field for displaying a list of natural language commands. When first invoked, the control program may display all available natural language commands in the list field. The list field is displayed on the display area of the computer or other devices used, for example in a dialog window. If the number of available natural language commands exceeds the size of the display area, a respective beginning part of the list is displayed and means to scroll through the list are offered.

The natural language commands are displayed in a non-hierarchical manner. They may especially be displayed in alphabetical order. They may also be displayed in another meaningful order, or in user-customized order.

The control program is configured to receive a plurality of inputs from the user, entered in succession, wherein each of the plurality of inputs corresponds to a character entered in the filter field. Responsive thereto, filtering of the natural language commands occurs. This filtering may in particular be initials-based filtering as described above. In this case a subset of natural language commands is created. This subset comprises only those entries from the list of natural language commands that have a plurality of words, the number of words in the natural language command being at least equal to the number of inputs received from the user. Also, the subset is reduced to those natural language commands where each of the plurality of inputs matches the first character of a respective one of the plurality of words in each of the natural language commands in succession. The number of natural language commands in the subset is progressively reduced in response to each successive input. The subset of natural language commands is displayed in the list field.

The user may mark one of the natural language commands from the subset of natural language commands displayed in the list field which may trigger the presentation of explanatory information associated with it.

To trigger execution of a marked natural language command the user may press a respective enter key. In response, the control program causes the target program to execute one or more target program commands associated with the natural language command in the control program.

To trigger execution of a natural language command from the subset displayed in the list field the user may also double click it with a computer mouse or the like.

The control program may further be configured to receive a search string and comprise a step of progressively filtering the list of natural language commands containing this search string, in response to each entered character. Filtering by initials may be combined with traditional search based filtering.

Filtering by initials may also be combined with filtering by a topic. In this case the presented method further comprises a step of selecting a topic and a step of filtering the list of natural language commands to only display those belonging to the selected topic.

The method may further comprise a step of automatically marking the first natural language command displayed in the list.

The method may further comprise a step of receiving the position of a natural language command in the list and in response thereto marking that natural language command.

The selection and subsequent execution of a natural language command can be customized to occur automatically, if its position has been entered or if only one natural language command is displayed as a result of the filtering.

The order, in which natural language commands are displayed, may be customized.

Natural language commands may be labeled as favorites. The user may select to only display natural language commands in the list that are labeled as favorites.

The wording of natural language commands, an explanation possibly associated with a natural language commands, topic(s) a natural language commands possibly belongs to, and the wording of a topic can be customized.

New natural language commands and new topics can be created.

Natural language commands outside context may be optionally hidden or grayed out and thus cannot be selected or marked.

The disclosed method may be implemented as a stand-alone computer-implemented program. It may also be implemented as a computer-implemented add-in program for a computer-implemented target program. It may further be integrated into a computer-implemented program as a computer-implemented sub program.

The disclosed method can be applied not only to natural language commands but to various other types of list elements. In that case the concepts disclosed relating to natural language commands can be readily applied to other types of list elements. Which action the control program initiates upon the user's selection of a list element depends on the type of list element and the target program's context at the time when the list element is selected.

If the list element consists of natural language commands, the control program may cause the target program to execute commands associated with the selected natural language command. If the list element consists of contacts, the control program may cause the target program, to display detailed data of the selected contact, to dial the phone number of the selected contact, create a new email to the selected contact, insert the postal address of the selected contact into a document, etc.

Which target program commands are executed depends on the target program's context at the time when the list element is selected. If the list e.g. consists of video or audio titles, the control program may cause the target program to play, copy, remove or display information related to the selected title. Which action to take depends on the target program's context at the time when the list element is selected.

The action invoked by selecting a list element may also be the displaying of a context menu, where the user can choose which specific action he wants the control program to trigger in the target program with respect to the selected list element.

The following detailed description of the invention is merely exemplary in nature and is not intended to limit the invention or the application and uses of the invention. Furthermore, there is no intention to be bound by any theory presented in the preceding background of the invention or the following detailed description of the invention.

DETAILED DESCRIPTION

The presently disclosed method can be implemented as a computer-implemented program to associatively and efficiently select elements from a textual electronic list. For illustration purposes, in this detailed description as well as in the figures, the method is explained on the basis of such an exemplary computer-implemented program. More specifically, the method is explained by illustrating an exemplary use of providing natural language commands in an electronic list to operate Microsoft Word™.

A suitable computing device may for example be a computing system environment as disclosed in U.S. Pat. No. 8,032,829 which is hereby incorporated by reference thereto in its entirety.

While the method is illustrated with regards to controlling an existing target software with natural language commands it should be appreciated that the method can be applied to electronic lists comprising any kind of elements, consisting of one or more strings (words), such as persons names, folder names, file names, video titles, audio titles, picture titles, book titles, document titles, pharmaceuticals, etc. It should be understood that the examples used to explain the present invention are intended for purposes of illustration only and are not intended to limit the scope of the invention.

Figure 1:
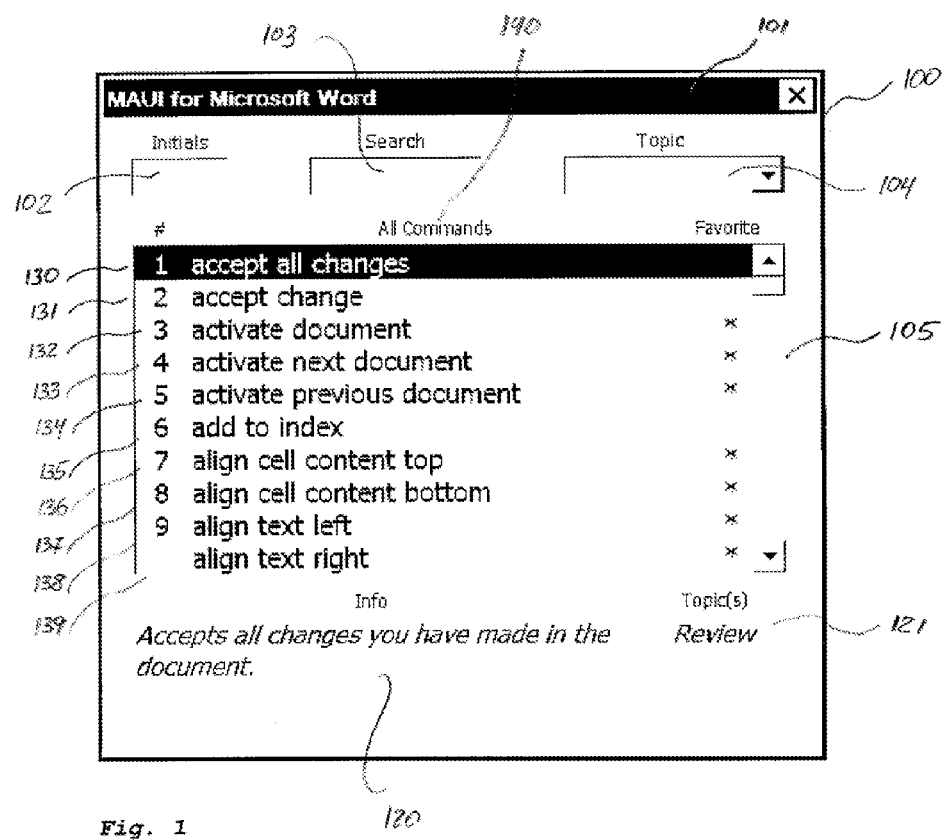
FIG. 1 shows an example of an electronic list displayed in a dialog window, where natural language commands for Microsoft Word™ are used as exemplary list elements, and where no filtering of the list has taken place.

FIG. 1 shows a dialog window 100 of the control program using natural language commands to operate Microsoft Word™. Dialog window 100 comprises a title bar 101, filter fields 102, 103, and 104, a list 105, and information field 120, 121.

Dialog window 100 is shown in an initial state after the control program has been invoked, but before any filtering has taken place. Only the first ten of several hundred natural language commands 130 ... 139 are visible in list 105.

In the title bar 101 of the dialog window 100 the term "MAUI™" is an abbreviation of "Mike's Associative User Interface™", a name for the control program. The title bar 101 also shows the name of the computer-implemented target program, which in this example is "Microsoft Word™". At the bottom of the dialog window 100 an explanation associated with the marked command is shown in an "Info" field 120. Further, one or more topics associated with the marked command is shown in the "Topics" field 121.

Natural language commands within list 105 can be filtered by entering the initials of their words in a respective initials filter field 102. Alternatively, a search filter field 103 allows filtering by character sequences. A topic filter field 104 allows filtering natural language commands by selection of a topic from a predetermined set of possible topics.

Figure 2:
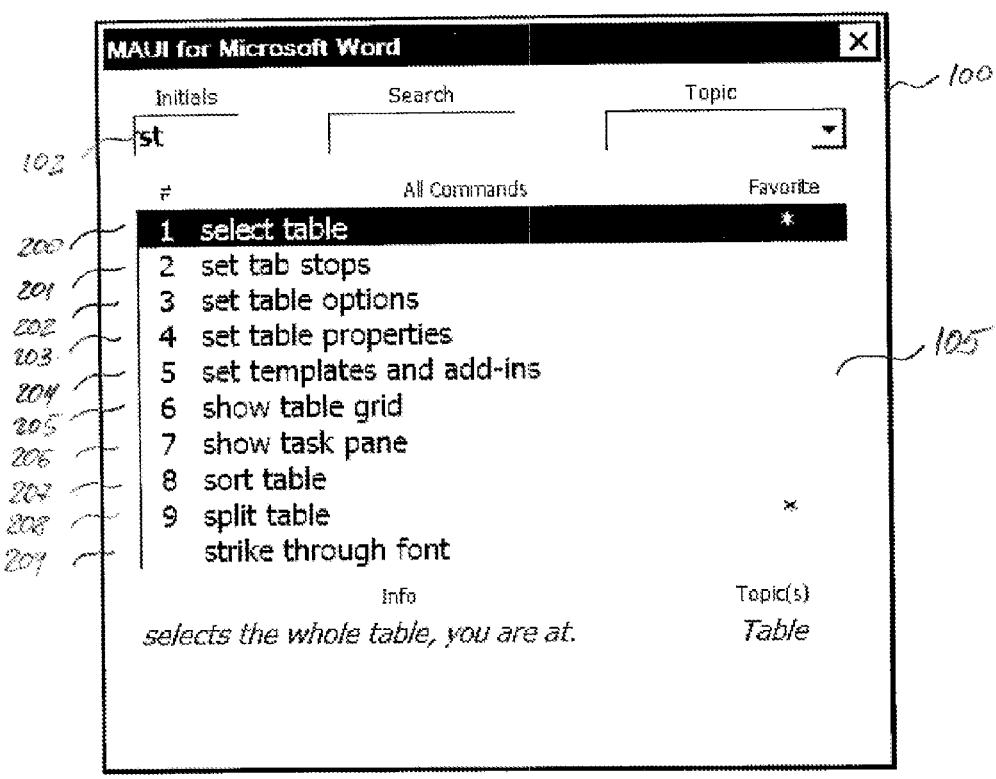
FIG. 2 shows an example of the electronic list as in FIG. 1, where the natural language commands have been filtered by their initials and the first natural language command is marked.

FIG. 2 shows dialog window 100 of the control program in a state where the initials "st" have been entered into initials filter field 102. Initials filter field 102 is labeled with the word "Initials". In response to the selection "st" in initials filter field 102 the control program displays only those natural language commands 200 ... 209 in list 105 whose first word starts with letter "s" and whose second word starts with letter "t", such as "select table" natural language command 200, "set tab stops" command 201, etc.

Letters a ... z that are consecutively entered into initials filter field 102 are used to filter those natural language commands whose first word begins with the first letter, whose second word begins with the second letter, and so forth. Numbers, however, are treated differently and used to filter numeric values within the same word of a natural language command. For example, the natural language command "zoom 125%" can be filtered by entering any one of the strings "z1", "z12", or "z125" in initials filter field 102.

Figure 3:
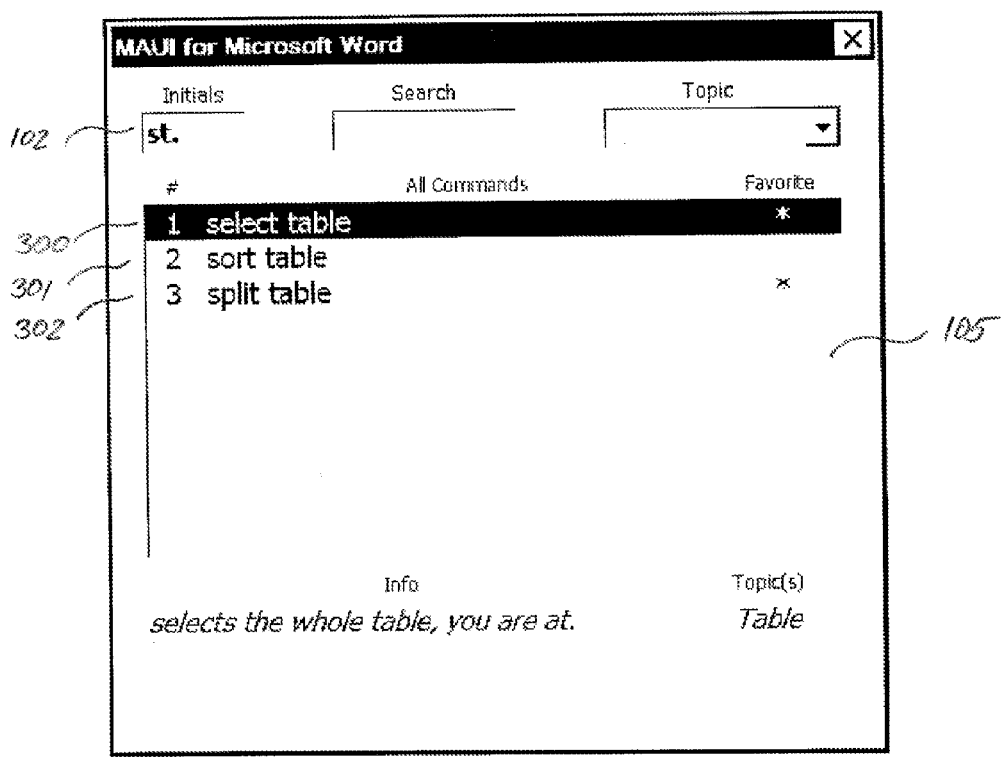
FIG. 3 shows an example of the electronic list as in FIG. 1, where the natural language commands have been filtered by their initials plus their number of words.

Referring now to FIG. 3, it is illustrated how in addition to filtering natural language commands by initials, natural language commands can be filtered by the number of their words. For this, a character defined as a word count delimiter is entered after initials have been entered into initials filter field 102. Subsequently, only those natural language commands are shown in list 105, whose number of words matches the number of initials entered into initials filter field 102.

The word count delimiter in this example is a period. The period has been entered after the initials "st" in initials filter field 102. In response, the control program has filtered the entries shown in list 105 to only those natural language commands that have initials "s" and "t" and consist of two words. In this example only three natural commands 300, 301, and 302 are listed. This is a more limited selection than the one shown in FIG. 2, where list 105 showed all natural language commands 200 ... 209 consisting of two or more words whose first word begin with "s" and whose second word begins with "t", but which may consist of three or more words.

Which character represents the word count delimiter may be customized by the user. For example a space, period, comma, semicolon, dash, or hash may be used. Letters, digits, and any other character which has been configured to support special function may not be used as a word count delimiter.

Filtering natural language commands within list 105 by their word initials and possibly by their word count typically reduces the list of remaining natural language commands sufficiently for all of them are visible on the display area. Thus the desired natural language command can be easily marked with arrow keys, a computer mouse, or the like.

To trigger execution of a marked natural language command in list 105 the user can press a respective enter key. In response, the control program causes the target program to execute one or more target program commands associated with the natural language command of the control program. If, for example, natural language command 300 is selected in list 105, the control program causes the target program, Microsoft Word, to select a table.

The user may also trigger the execution a natural language command displayed in the list 105 by double clicking it with a computer mouse or the like.

Depending on the natural language command, a respective dialog window may be opened so that required information can be entered. If, for example, a natural language command "color font" is executed, a dialog window is opened, in which a color can be selected.

Figure 4:
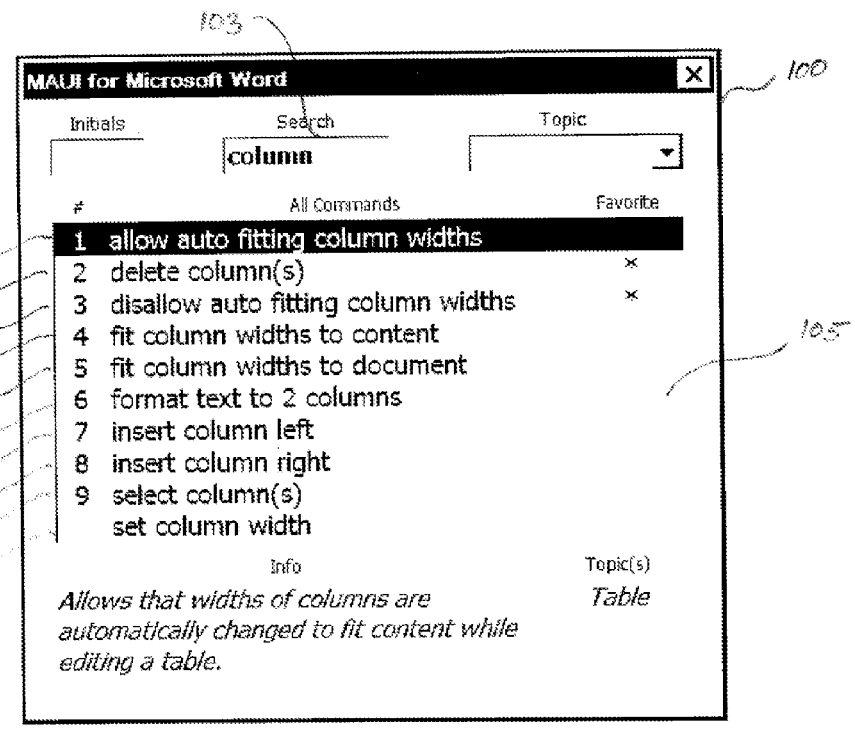
FIG. 4 shows an example of the electronic list as in FIG. 1, where the natural language commands have been filtered by a search string.

Referring now to FIG. 4, an alternative method of filtering natural language commands by search strings is illustrated. As shown, natural language commands can be filtered by a search string (a sequence of letters and/or digits), contained in the natural language commands to be filtered. As illustrated, the search string "column" has been entered in the search filter field 103, which is labeled "Search". In response, only natural language commands 400 ... 409 which include the string "column" are shown in the list 105. Search filter field 103 is a free-form field, allowing the user to enter any desired sequence of characters.

Figure 5:
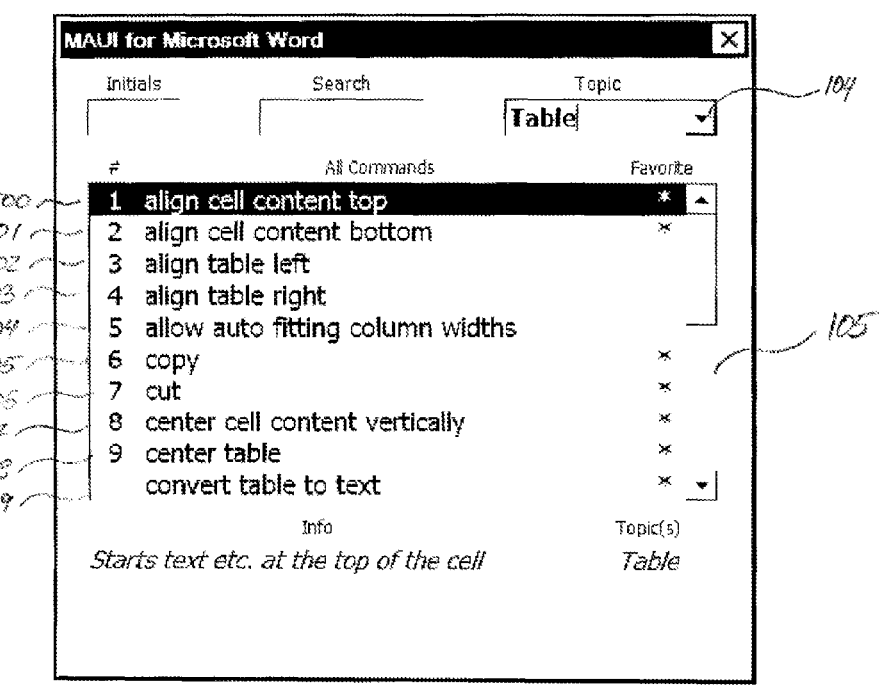
FIG. 5 shows an example of the electronic list as in FIG. 1, where the natural language commands have been filtered by a selectable topic.

In contrast, topic filter field is a drop-down selection field, allowing the user to select one topic from a predetermined set of possible topics. As shown in FIG. 5 natural language commands can be filtered by a topic, so that the user gets an overview of all natural language commands belonging to a topic. Topics are provided for target applications where appropriate and can be selected in a corresponding topic filter field 104. Topics can be created and customized.

FIG. 5 shows dialog window 100 of the control program, where topic "Table" has been selected in the corresponding topic filter field 104, in this example dropdown combo box field "Topic". As a result only natural language commands 500 ... 509 belonging to that topic are shown in list 105.

A natural language command may belong to more than one topic. For example, the "copy" natural language command 505 may belong to topics "Text", "Tables", and "Illustrations".

Filtering a topic is a useful feature in addition to filtering a search string, since natural language commands may not contain the names of the topics they belong to. For example, the natural language command "align cell content top" belongs to topic "Table" without containing the term "table". Such natural language commands would not be found by merely filtering by the search string "table".

While initials filter fields 102, search filter field 103, and topic filter field 104 are shown as separate fields in the drawings it should be understood that initials, search strings and topics filter fields can be combined into one or two entry fields.

To speed up selection of a natural language command preferably the first entry in list 105 is automatically marked. As illustrated, this is the "accept all changes" command 130 in FIG. 1, the "select table" natural language command 200 in FIG. 2, and so forth. With every step of progressively filtering natural language commands, the respective first natural language command displayed is automatically marked. This relieves the user from manually marking the respective first natural language command in order to select it.

A natural language command can be marked by entering its position in the list of filtered elements, optionally prefixed by a character defined as position prefix. This step is usually done after entering initials or a search string. Marking a natural language command by entering its position is often faster than marking a natural language command with the computer mouse or arrow keys, especially if a natural language command is displayed further down in the list of filtered elements.

The user can customize which characters he wants to use as the optional position prefix, for example a period, comma, semicolon, dash, or hash. Excluded are letters, digits and characters defined as a word count delimiter.

Figure 6:
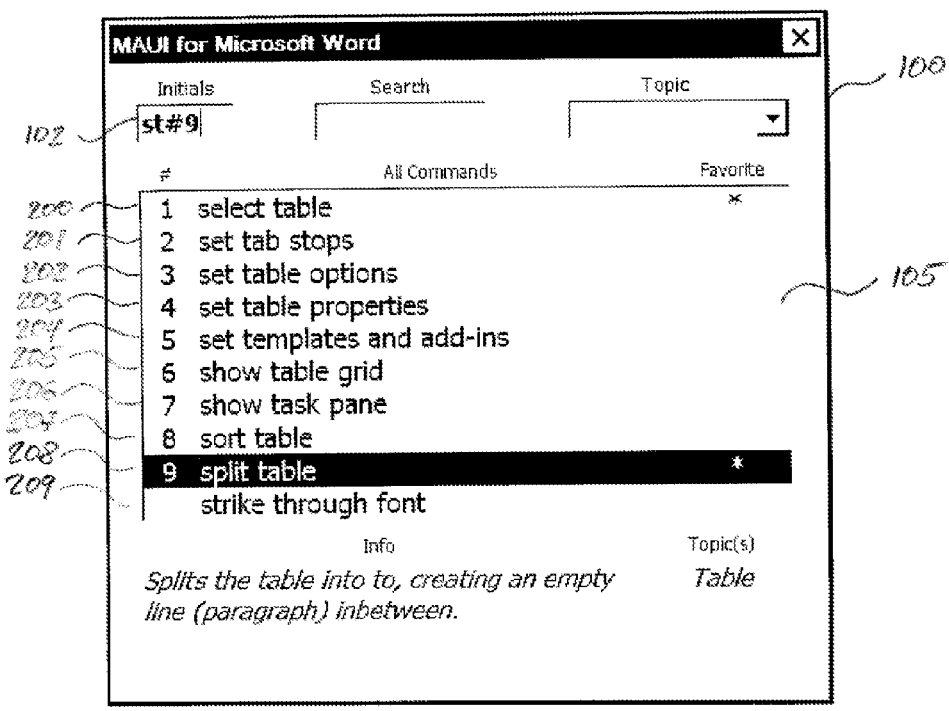
FIG. 6 shows an example of the electronic list as in FIG. 1, where the natural language commands have been filtered by their initials, and the $9^{th}$ natural language command has been marked by entering its position.

Referring now to FIG. 6, the concept of marking natural language commands by their position number is illustrated. FIG. 6 shows the dialog window 100 after the same initials "st" have been entered as previously shown in FIG. 2. Consequently, the same natural language commands 200 . . . 209 are shown in list 105. However, additionally the position number "#9" has been entered into initials filter field 102. In response, the "split table" command 208, which is in the 9th position in the list, is marked instead of the "select table" command 200 which is marked in FIG. 2.

Figure 7:
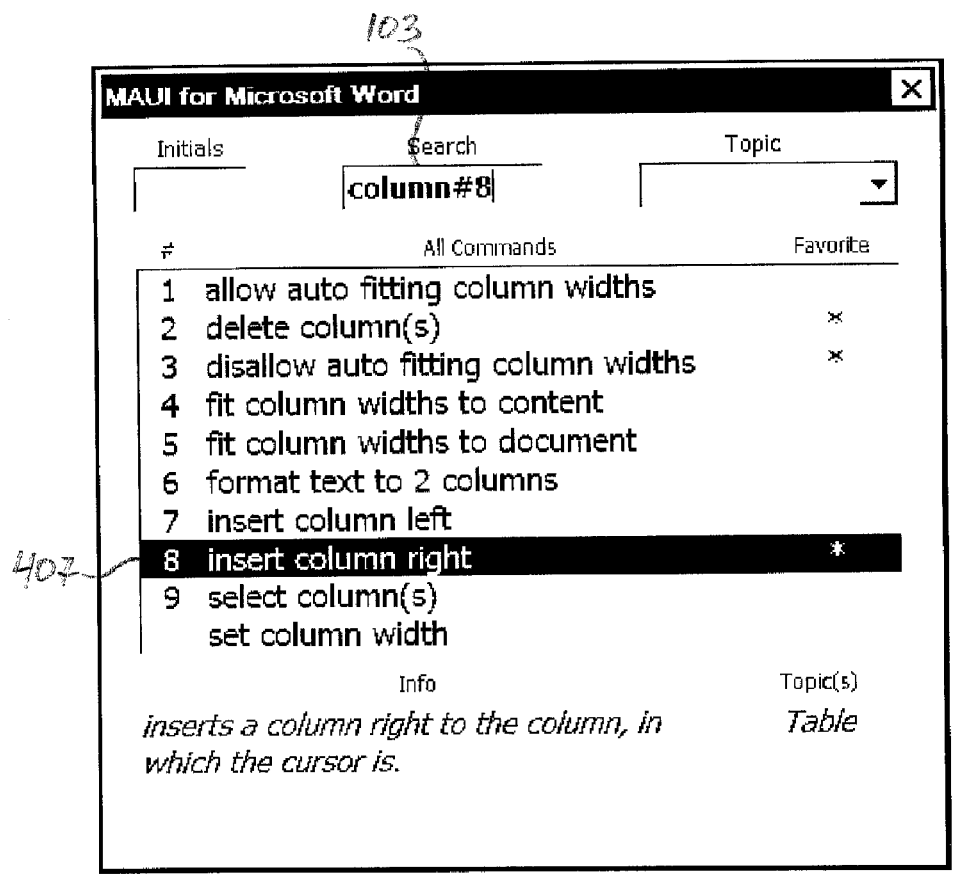
FIG. 7 shows an example of the electronic list as in FIG. 1, where the natural language commands have been filtered by a search string, and the natural language command has been marked by entering its position.

The same selection by list position number applies to search filter field 103. FIG. 4 shows a dialog window 100 of the control program, where the search string "column" has been entered in the search filter field 103. As a result only natural language commands containing that search string are listed in list 105 and the "allow auto fitting column width" command 400 shown in first position is automatically marked. FIG. 7 shows dialog window 100, after a position prefix (in this example a hash) and digit "9" have been additionally entered into search filter field 103. As a result, the "insert column right" command 407 appearing in eighth position is marked.

Figure 8:
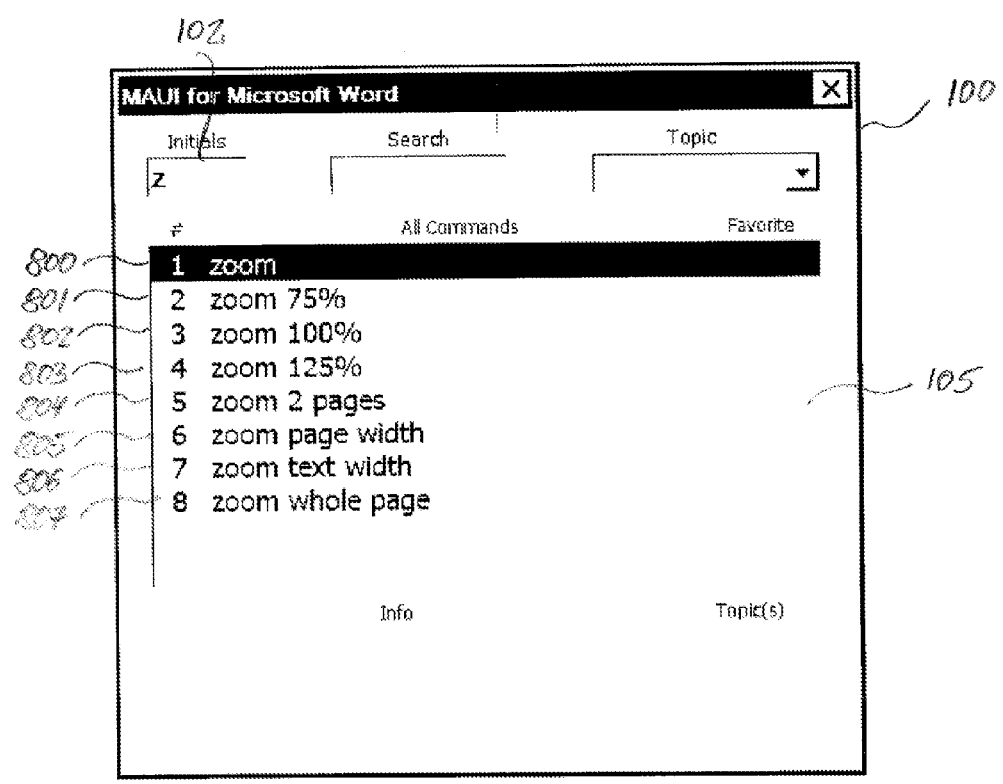
FIG. 8 illustrates the difference between preference of content and preference of position.

In cases where the position prefix is omitted and it is ambiguous how the natural language commands shall be filtered, the user has the option, to give preference to filtering by the natural language command's content or to give preference to filtering by their position. FIG. 8 shows dialog window 100 of the control program, where the initial "z" has been entered in the initials filter field 102. As a result natural language commands 800 . . . 807 whose first word starts with letter "z" are listed in list 105. If digit "7" is entered subsequently into initials filter field 102, and preference has been given to filtering by the list's content, only the "zoom 75%" command 801 will be displayed. If preference has been given to filtering by the command's position, the "zoom text width" command 806 appearing in seventh position will be marked.

Figure 9:
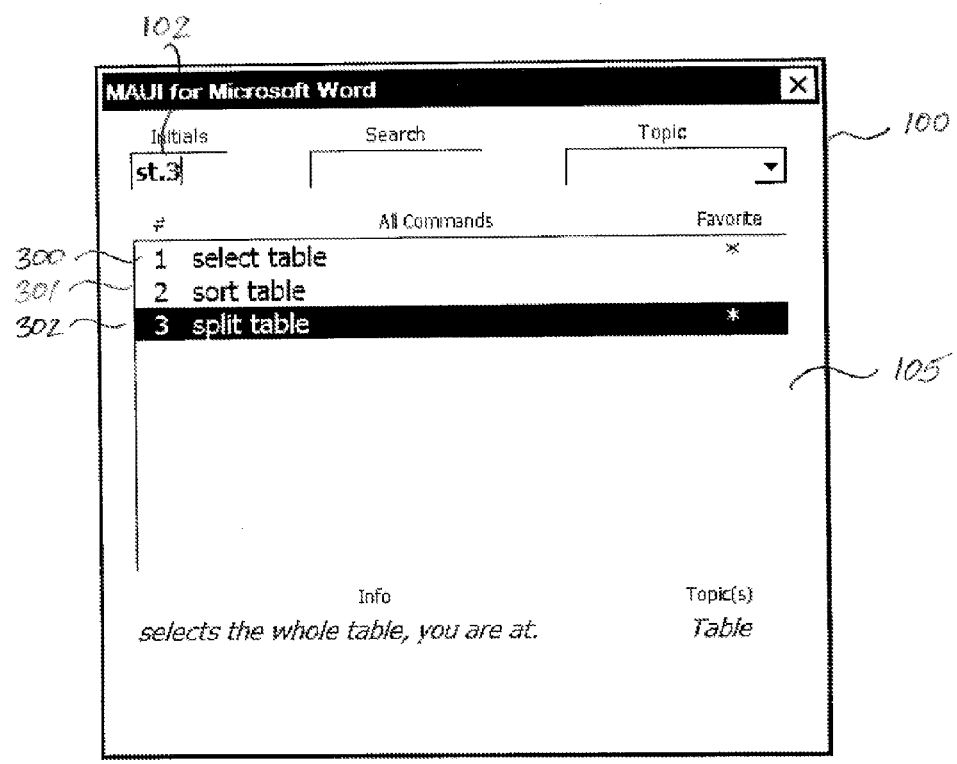
FIG. 9 shows an example of the electronic list as in FIG. 1, where the natural language commands have been filtered by their initials plus their number of words and the natural language command has been marked by entering its position.

The position of a list element can also be entered after a word count delimiter, which has a different effect, as shown with reference to FIG. 9. It shows dialog window 100 of the control program, where the initials "st" and a word count delimiter (in this example a period) have been entered in the initials filter field 102. As a result only natural language commands 300 . . . 302 with these initials consisting of two words are listed. This is identical to what is shown in FIG. 2. However, while in FIG. 2 the "select table" natural language command 300 appearing in first position in list 105 is marked FIG. 9 shows the "split table" command 302 appearing in third position being marked. This is due to an additional digit "3" that has been entered into initials filter field 102.

The user can customize, that a natural language command is automatically selected, if the position of a natural language command has been entered, and/or if the filtered list has been reduced to one element. Automatic selection of a natural language command means that it is automatically executed. The user does not have to press a respective enter key, or double click the natural language command.

The user can further customize, that natural language commands outside context are hidden or grayed out, so that they cannot be selected. For example, if the option to gray out natural language commands outside context has been selected and the cursor position (insertion point) is outside a table, the natural language command "select table" will be listed grayed out. Graying out is commonly done with menu items and symbols in many computer-implemented programs.

By default, the control program lists elements appearing in list 105 alphabetically. In order to access frequently used natural language commands faster, the user can customize this order by moving natural language commands up or down the list.

Figure 10:
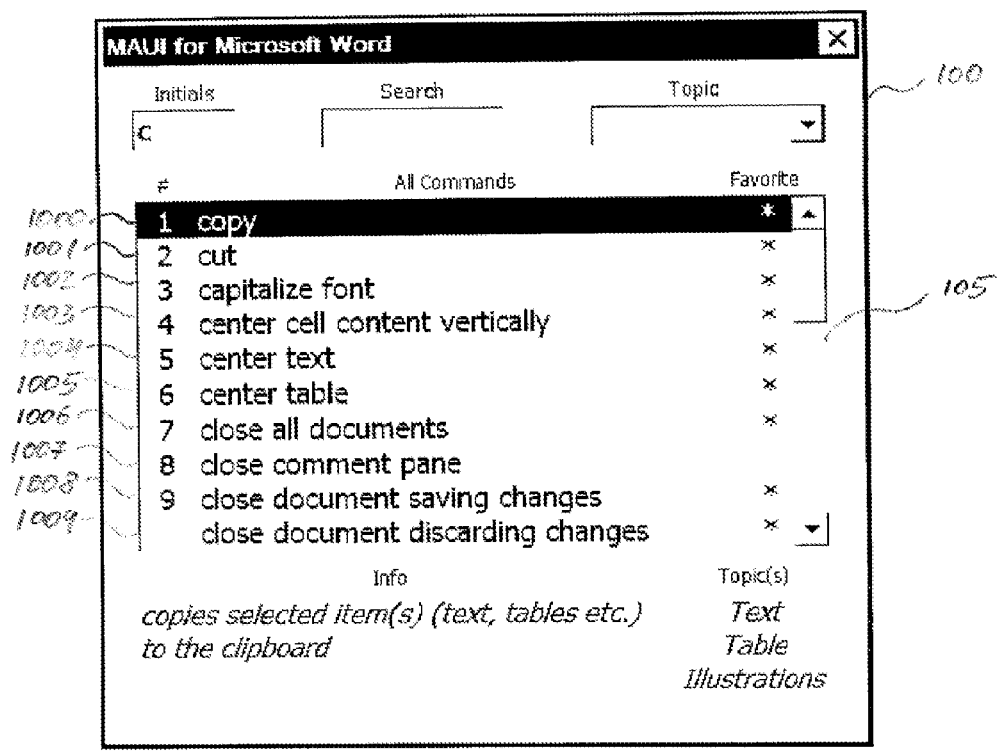
FIG. 10 shows an excerpt of the electronic list as in FIG. 1, where the order of natural language commands has been customized.

In addition, the user can customize that natural language commands are listed alphabetically or that natural language commands are listed in customized order. FIG. 10 shows dialog window 100 of the control program, where natural language commands 1000 . . . 1009 are listed in customized order. In this example the "copy" command 1000 and the "cut" command 1001 have been moved up to the beginning of letter "c", appearing out of their alphabetical order. The customized order is persisted, so that it is available for future use of the control program.

Natural language commands may be labeled as favorites, and the user can customize, if all or only favorite natural language commands are listed and filtered. The labeling is persisted, so that it is available for future use of the control program.

Figure 11:
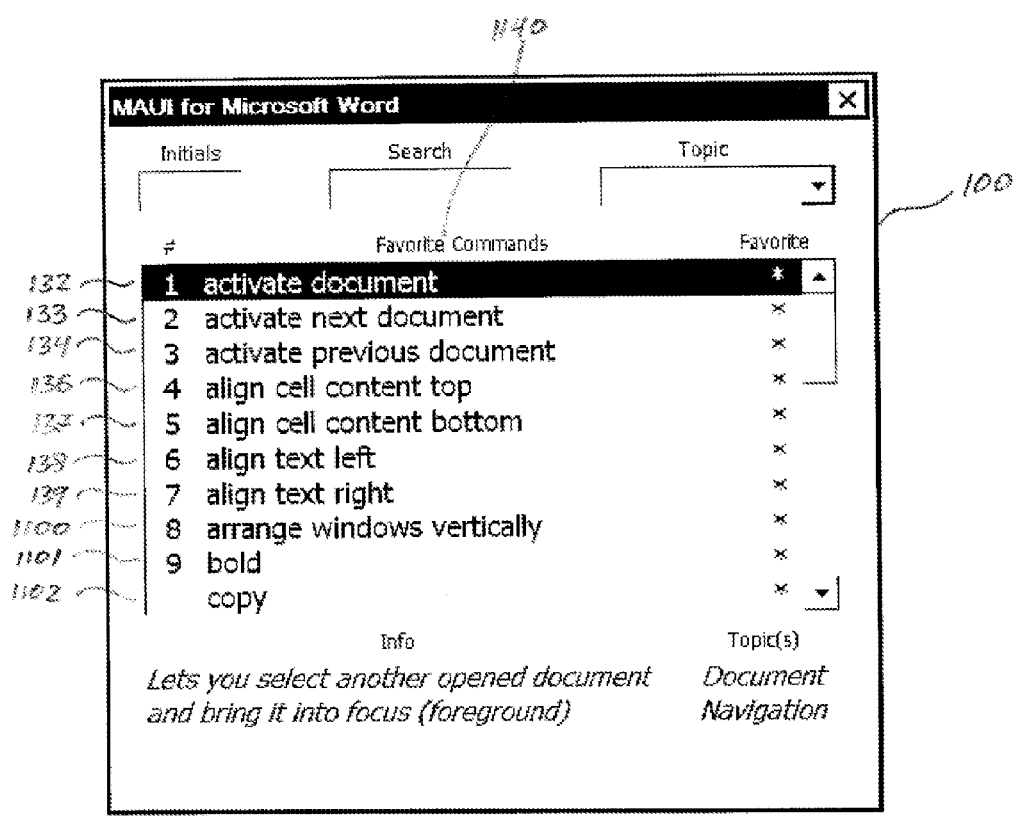
FIG. 11 shows an example of the electronic list as in FIG. 1, where only natural language commands labeled as favorites are listed.

FIG. 1 shows dialog window 100 of the control program, where favorite commands are indicated by a star ("*") in the right column of the list 105 headed "Favorite". All natural language commands 130 . . . 139 are listed and filtered, indicated by the "All Commands" heading 140 of the middle column of the list. FIG. 11 shows the same dialog window 100, where only natural language commands (132, 133, 134, 136, 137, 138, 139, 1100, 1101, 1102) labeled as favorites are listed and filtered, indicated by the "Favorite Commands" heading 1140 of the middle column of the list.

The wording of a natural language command, an explanation possibly associated with a natural language command, and the topic(s), a natural language command possibly belongs to, can be customized. The wording of a topic can also be customized. The original information is kept and can be restored.

Customized natural language commands are created by assembling one or more standard natural language commands, including parameters where appropriate. When a custom natural language command has been selected, these standard natural language commands are then automatically executed in the sequence defined, using the parameters defined. Customized natural language commands of other types can be created in corresponding ways, taking into account their specific nature and characteristics. Custom topics can also be created.

Figure 12:
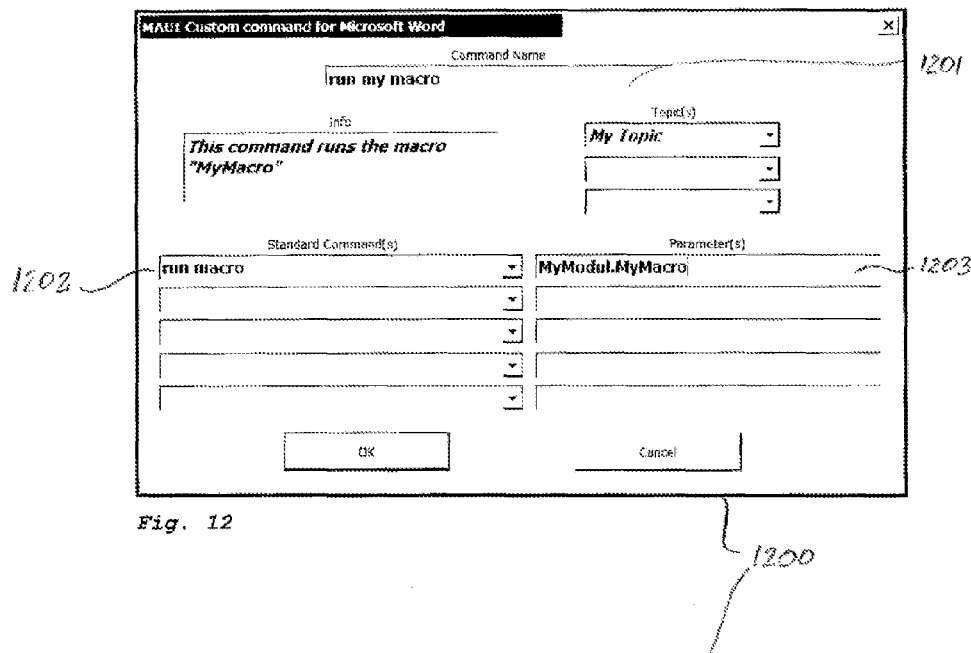
FIG. 12 shows an example of a dialog window for customizing a natural language command.

FIG. 12 shows a customization dialog window 1200 of the control program to customize commands. A customized natural language command consisting of the target program command 1202 "run macro" plus the parameter 1203 "MyModul.MyMacro" have been defined. The target program command 1202 is associated with the natural language command "run my macro" entered in command name field 1201. If selected, the macro "MyModul.MyMacro" is automatically executed. Using such a customized natural language command relieves the user from having to select a macro from a possibly long list of macros, every time he wants to execute it.

Figure 13:
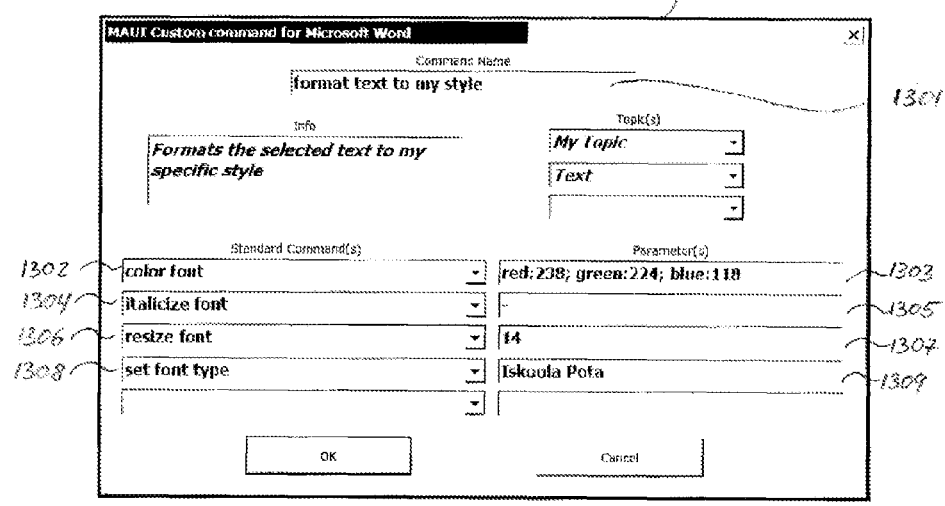
FIG. 13 shows a second example of a dialog window for customizing a natural language command.

FIG. 13 shows a customization dialog window 1200 of the control program to customize commands, where the customized natural language command 1301 consists of several target program commands 1302, 1304, 1306, 1308 including parameters 1303, 1305, 1307, and 1309 where appropriate. In this example, a set of formatting instructions has been combined to one natural language command. Using this customized natural language command relieves the user from having to execute each individual target program command every time he wants to apply this combination of formatting instructions.

Customization may be applied also when using the disclosed method beyond natural language control. If, for example, the list consists of video or audio titles, the control program may provide a customization dialog window, where new titles can be added, and various information associated with the title can be entered, such as a link to the actual video or audio files, so that the control program may trigger the playing of the title.

To customize the control program, the control program is treated as any other computer-implemented target program. The control program becomes its own computer-implemented target program. That is: In the respective dialog window of the control program the user can open a second dialog window, in which he can select natural language commands to customize the control program. Commands to customize the control program are for example:
  enter numbers by initials
  enter numbers as they are
  give preference to filtering by content
  give preference to filtering by position
  select command automatically when entering position
  don't select command automatically when entering position
  select command automatically when distinct
  don't select command automatically when distinct
  show commands outside context
  gray out commands outside context
  hide commands outside context
  move command down
  move command up
  list commands alphabetically
  list commands in customized order
  add command to favorite commands
  remove command from favorite commands
  show all commands
  show favorite commands
  customize command
  customize topic
  create custom command
  change custom command
  delete custom command
  create custom topic
  change custom topic
  delete custom topic.

Figure 14:
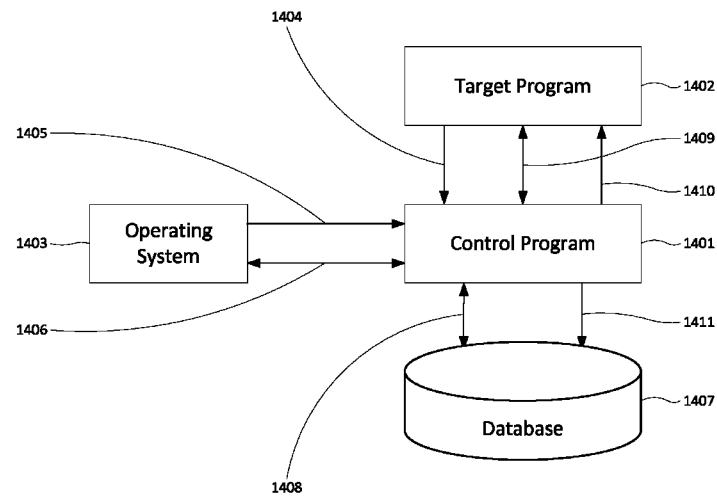
FIG. 14 is a high level block diagram that shows how a stand-alone control program may interact with a target program that is not an operating system.

FIG. 14 shows an exemplary interaction of control program 1401 with target program 1402. Control program 1401 is implemented as a stand-alone program. Target program 1402 and control program 1401 are executed on a computer or other computing device having an operating system 1403. Control program 1401 may be invoked either trough an interaction with target program 1402 or through an interaction with operation system 1403. Invoking control program 1402 may be affected by a dedicated function key, key combination, icon, or menu, while controlling target program 1402. Invoking control program 1402 through an interaction with the target program 1402 is indicated by arrow 1404. Alternatively, control program 1401 may be invoked through operating system 1403, as indicated by arrow 1405.

If control program 1401 is invoked via the operating system 1403, the control program 1401 may inquire the information from the operating system 1403, if the target program 1402 is opened or active, as indicated by arrow 1406. If the target program 1402 is not opened or active, the control program 1401 may ask the user, if it shall open or activate target program 1402.

To improve performance, control program 1401 may be kept resident in the computer's main memory.

Natural language commands to control target program 1402 may be stored in database 1407. Control program 1401 obtains information relating to natural language commands by querying database 1407, as indicated by arrow 1408. Information stored in database 1407 may include natural language commands in one or more languages, code to execute target program commands associated with a natural language command, additional explanatory information related to a natural language command, or the like.

Control program 1401 communicates bidirectionally with target program 1402 as indicated by arrow 1409. Control program 1401 inquires information on context and current state of target program 1402 through communication 1409. Such information is utilized by control program 1401 to e.g. determine, if a natural language command is to be grayed out or hidden. This inquiry of the target program 1402 by the control program 1401 may be done via an Application Programmers Interface (API) provided by the target program 1402.

When the user has selected a natural language command in order to execute it, control program 1401 causes the target program 1402 to execute one or more target program commands associated with the natural language command of the control program, as indicated by arrow 1410. This may be done via the Application Programmers Interface (API) provided by the target program 1402.

Control program 1401 may update the natural language commands' database 1407, as indicated by arrow 1411, if any of the following user actions occur:
  a) The user labels a natural language command as favorite or removes such a label.
  b) The user changes the customized order of natural language commands.
  c) The user changes commands or topics
  d) The user adds, changes or removes customized commands or customized topics
  e) The user changes the settings of the control program 1401.

Settings of control program 1401 may alternatively be stored in a database of the operating system 1403, if operating system 1403 provides such a database, as for instance the Registry in the case of the operating system Microsoft™ Windows™.

Figure 15:
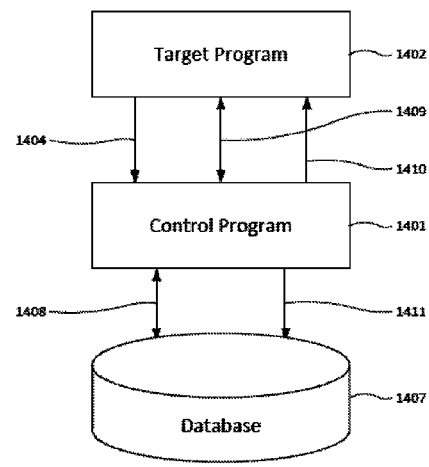
FIG. 15 is a high level block diagram that shows an alternative interaction of a control program with a target program.

FIG. 15 illustrates an alternative interaction of control program 1401 with target program 1402. As illustrated, control program 1401 may be implemented as a stand-alone program, and target program 1402 may be an operating system. This is a special variation of the interaction described with reference to FIG. 14 above. Here, the operating system is the target program 1402, and invokes the control program 1401, as indicated by arrow 1404.

Natural language commands to control target program 1402 may be stored in database 1407. Whenever control program 1401 needs information on natural language commands, it queries the natural language commands' database 1407, as indicated by arrow 1408.

Whenever control program 1401 needs information about target program 1402, it inquires such information from target program 1402 as indicated by arrow 1409. This inquiry of target program 1402 by the control program 1401 may be done via the Application Programmers Interface (API) provided by the target program 1402.

When the user has selected a natural language command in order to execute it, control program 1401 causes target program 1402 to execute one or more target program commands associated with the natural language command of the control program 1401, as indicated by arrow 1410. This execution may be triggered via the Application Programmers Interface (API) provided by the target program 1402.

The control program 1401 may update the natural language commands' database 1407, if appropriate, as indicated by arrow 1411.

If target program 1402 provides add-in embedding, control program 1401 may alternatively be embedded as an add-in into target program 1402. Natural language commands to control the target program 1402 may by stored in a database 1407. Whenever control program 1401 needs information on natural language commands, it queries the natural language commands' database 1407, as indicated by arrow 1408.

Whenever control program 1401 needs information about target program 1402, it inquires such information from target program 1402 as indicated by arrow 1409. This inquiry to target program 1402 by control program 1401 may now be done via the add-in interface provided by target program 1402.

If the user has selected a natural language command in order to execute it, control program 1401 causes target program 1402 to execute one or more target program commands associated with the natural language command of control program 1401, as indicated by arrow 1410. This execution may now be triggered via the add-in interface provided by target program 1402.

Figure 16:
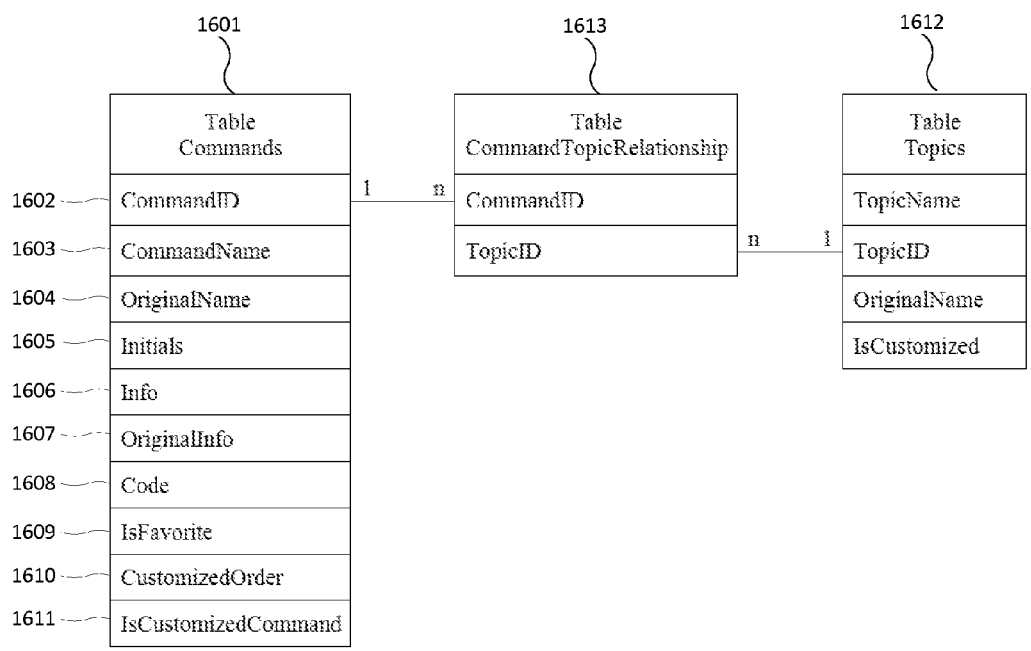
FIG. 16 is an entity relationship diagram of central tables of a database used by the control program to retrieve and store information on natural language commands.

FIG. 16 shows the central part of the data structure of the natural language command database. The natural language commands for a target program may be compiled and stored with all necessary information in a table 1601 "Commands". The name of a command is stored in table field 1603 "CommandName". It may be changed by the user. The original name of a natural language command is maintained in table field 1604 "OriginalName", in order to be able to restore the original name. In order to have sufficient performance, when natural language commands are selected by initials, a respective table field 1605 "Initials" may be provided as an indexed table field. Table field 1605 "Initials" may be filled automatically by a respective sub program. To execute commands of the target program associated with a selected natural language command, code is dynamically compiled and executed. This code may be stored in table field 1608 "Code". To be able to persist labeling of natural language commands as favorites and to be able to show only favorite natural language commands, table field 1609 "IsFavorite" is provided. To be able to persist listing of natural language commands in customized order, table field 1610 "CustomizedOrder" is provided. With table field 1611 "IsCustomizedCommand" the control program can ensure, that a user can only delete customized natural language commands.

Topics of the target program are stored in the separate table 1612 "Topics". To be able to assign several topics to a natural language command, a relationship table 1613 "CommandTopicRelationship" is provided.

Figure 17:
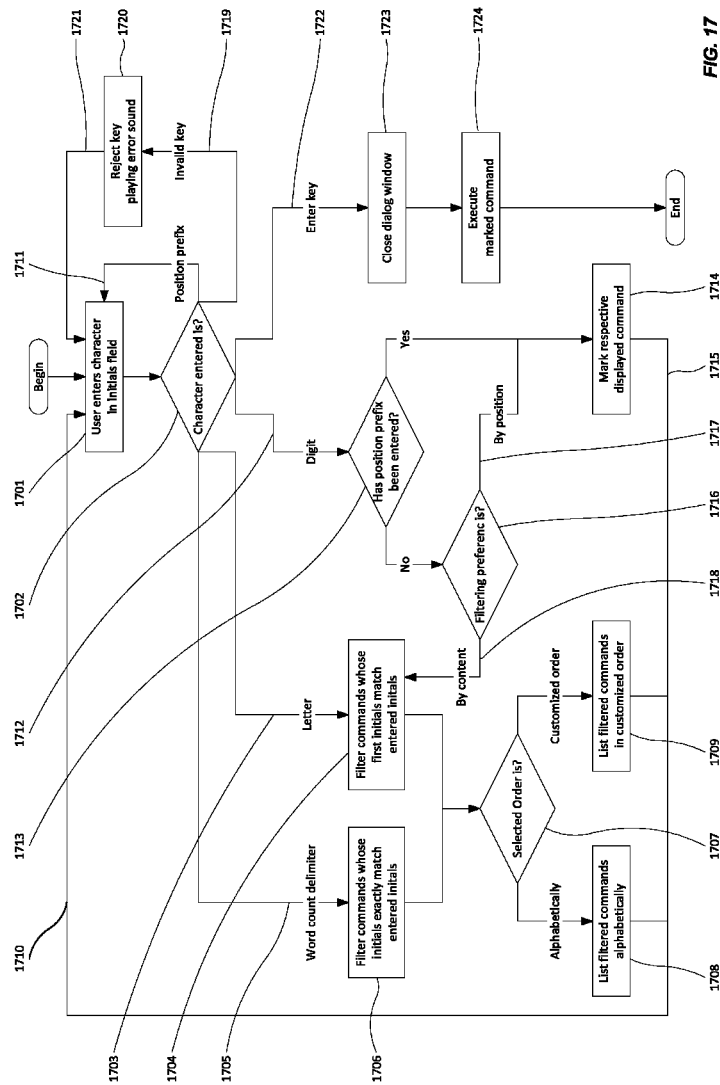
FIG. 17 is a control flow diagram that illustrates how entries of initials are processed.

FIG. 17 is a control flow diagram that illustrates how entries of initials may be processed. The illustration begins where the user enters a key in the initials field, as indicated by process box 1701. The control program analyses the type of character entered, as indicated by decision diamond 1702, and invokes different types of action depending on the type of key entered. In this figure an excerpt of six different types of action are shown.

If the user has entered a letter, as indicated by arrow 1703, the control program filters out natural language commands, whose first initials match the characters already entered in identical order, as indicated by process box 1704. If the user has entered a character defined as word count delimiter, as indicated by arrow 1705, the control program filters all natural language commands, whose initials exactly match the characters already entered in identical order, as indicated by process box 1706. Depending on the order the user has chosen, as indicated by decision diamond 1707, the filtered natural language commands are listed either alphabetically or in customized order, as indicated by process boxes 1708 and 1709. After the control program has listed the natural language commands in the respective display field, it waits for further user input from the user, as indicated by arrow 1710.

If the user enters a position prefix, as indicated by arrow 1711, no action of the control program is necessary, and the control program just waits for further input. If the user enters a digit, as indicated by arrow 1712, the control program checks if the user has previously entered a character defined as position prefix or has entered a character defined as word count delimiter, as indicated by decision diamond 1713. If this is the case, the control program marks the respective displayed natural language command, as indicated by process box 1714 and waits for further user input, as indicated by arrow 1715.

If the user enters a digit and has not previously entered a position prefix, the next step depends on the filtering preference, set by the user, as indicated by decision diamond 1716. If filtering preference is by position, as indicated by arrow 1717, the control program marks the respective displayed command, as indicated by process box 1714 and waits for further input from the user, as indicated by arrow 1715. If the filtering preference is by content, as indicated by arrow 1718, the control program continues with the filtering of natural language commands whose first initials match the characters already entered, as indicated by process box 1704.

If the user enters a key, that is invalid in the context, as indicated by arrow 1719, the control program triggers an error sound, as indicated by process box 1720. The next step is to wait for user input, as indicated by arrow 1721.

These loops of user input and a respective reaction of the control program continue until the user presses a respective enter key, as indicated by arrow 1722. Subsequently the control program closes its dialog window and executes one or more commands of the target program associated with the marked natural language command as indicated by process boxes 1723 and 1724.

The disclosed method is particularly suitable to use natural language commands as list elements to operate a computer-implemented target program. The non-hierarchical listing of natural language commands as short natural language sentences combined with the selection via word initials, word number and the other features described is an innovation that can significantly simplify use of computer-implemented programs on computers and other devices. Thus the disclosed method offers much more than just the finding of commands, as is the case with the online help of many computer-implemented programs, because a command can not only be found easily but can also be executed directly.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A computer-implemented method for controlling a target program by natural language, the method comprising:
   providing a control program which is executed concurrently with the target program on a computing device, the control program comprising a list of natural language commands, each natural language command comprising one or more words starting with a first character and each natural language command being associated with one or more commands of the target program;
   generating a graphic user interface by the control program to receive inputs from a user, the graphic user interface comprising a filter field for entering characters and a list field for displaying natural language commands;
   receiving a plurality of inputs from the user, entered in succession, wherein each of the plurality of inputs corresponds to a character entered in the filter field;
   creating a subset of natural language commands comprising only those entries from the list of natural language commands that have a plurality of words, a count of words in the natural language command being equal or greater than a count of inputs received from the user, wherein each of the plurality of inputs matches in identical order the first character of a respective one of the plurality of words in each of the natural language commands, and wherein available natural language commands in the subset are progressively reduced in response to each successive input;
   displaying the subset of natural language commands in the list field;
   enabling the user to select one of the natural language commands from the subset of natural language commands displayed in the list field; and
   causing the target program to execute one or more commands in response to the user's selection of the one of the natural language commands in the control program.

2. The method as in claim 1, wherein the control program is executed as a stand-alone executable program or as an add-in of the target program.

3. The method as in claim 1, wherein natural language commands in the list of natural language commands comprise at least a verb and a noun.

4. The method as in claim 1, further comprising the step of receiving a word count delimiter entered in the filter field, and in response thereto filtering the subset of natural language commands to comprise only those entries from the list of natural language commands, that have a plurality of words, the count of words in the natural language command being equal to the count of inputs received from the user before the word count delimiter was received.

5. The method as in claim 1, further comprising the step of automatically marking the first entry from the subset of natural language commands shown in the list field.

6. The method as in claim 1, wherein natural language commands shown in the list field are associated with numerical positions, further comprising a step of receiving a numerical position of a natural language command shown in the list field and marking the natural language command that is associated with the received numerical position in response thereto.

7. The method as in claim 1, wherein natural language commands are shown in user selectable order in the list field.

8. The method as in claim 1, further comprising the step of displaying explanatory information associated with a natural language command in the list field.

9. The method as in claim 1, further allowing the user to label natural language commands as favorites, and displaying only those natural language commands in the list that have been marked as favorites.

10. The method as in claim 1, further allowing the user to add custom natural language commands to the list of natural language commands and associating with each of them one or more commands of the target program to be executed.

11. The method as in claim 1, further comprising the step of receiving context information from the target program in the control program and making unavailable those natural language commands that are associated with commands of the target program that are not available in the context of the target program.

12. A computer-implemented method for controlling a program by natural language commands, the method comprising:
   providing a list of natural language commands, each natural language command being associated with one or more commands of the program;
   generating a graphic user interface to receive inputs from a user, the graphic user interface comprising a filter field for entering characters and a list field for displaying natural language commands;
   receiving a plurality of n inputs from the user, entered in succession, wherein each of the number of n inputs corresponds to a character entered in the filter field;
   creating a subset of natural language commands comprising only those entries from the list of natural language commands having n or more words, wherein the respective first character of the first n words match the n inputs from the user;
   displaying the subset of natural language commands in the list field;
   enabling the user to select one of the natural language commands from the subset of natural language commands displayed in the list field; and
   causing the program to execute a command in response to the user's selection of a natural language command.

13. The method as in claim 12, further comprising the step of receiving a word count delimiter input from the user in the filter field, and in response thereto filtering the subset of natural language commands comprising only those entries from the list of natural language commands having exactly n words, wherein the respective first letter of the first n words match the n inputs from the user.

14. The method as in claim 12, wherein natural language commands in the list of natural language commands comprise at least a verb and a noun.

15. The method as in claim 12, further comprising the step of automatically marking an entry from the subset of natural language commands shown in the list field.

16. The method as in claim 12, wherein natural language commands shown in the list field are associated with a numerical position, further comprising a step of receiving the numerical position of a natural language command shown in the list field and marking the natural language command that is associated with the received numerical position in response thereto.

17. The method as in claim 12, wherein natural language commands are shown in user selectable order in the list field.

18. The method as in claim 12, further comprising the step of displaying explanatory information associated with a natural language command in the list field.

19. The method as in claim 12, further allowing the user to label natural language commands as favorites, and displaying only those natural language commands in the list that have been marked as favorites.

20. The method as in claim 12, further allowing the user to add custom natural language commands to the list of natural language commands and associating with each of them one or more commands of the program.

21. The method as in claim 12, further comprising the step of receiving context information from the program and making unavailable those natural language commands that are associated with commands of the program that are not available in the context of the program.

22. The method as in claim 12, wherein the program is a word processing program, a spreadsheet program, a presentation program, or an accounting program.

23. A non-transitory computer readable media having computer-readable instructions therein that, when executed by a computer, cause the computer to execute a method for controlling a target program by natural language commands as in claim 1.

24. A non-transitory computer readable media having computer-readable instructions therein that, when executed by a computer, cause the computer to execute a method for controlling a target program by natural language commands as in claim 12.

25. The method as in claim 1, wherein the list of natural language commands is stored in a database and wherein at least one natural language command stored in the database has been customized by the user.

26. The method as in claim 12, wherein the list of natural language commands is stored in a database and wherein at least one natural language command stored in the database has been customized by the user.

27. The method as in claim 1, wherein the step of executing an entry from the subset of natural language commands is performed automatically when the subset of natural language commands consists of one entry.

28. The method as in claim 12, wherein the step of executing an entry from the subset of natural language commands is performed automatically when the subset of natural language commands consists of one entry.

29. The method as in claim 6, wherein the step of executing an entry from the subset of natural language commands is performed automatically when the user enters a numerical position associated with a natural language command.

30. The method as in claim 16, wherein the step of executing an entry from the subset of natural language commands is performed automatically when the user enters a numerical position associated with a natural language command.

31. The method as in claim 1, wherein at least one command in the target program is associated with more than one natural language command.

32. The method as in claim 12, wherein at least one command in the program is associated with more than one natural language command.

* * * * *